Dec. 7, 1965     A. BUYS     3,221,533

METHODS OF MANUFACTURING THREADED CLOSURES

Original Filed Nov. 28, 1962

INVENTOR.

Adriaan Buys,
BY Wolfe, Hubbard, Voit & Osann
Attorneys.

United States Patent Office
3,221,533
Patented Dec. 7, 1965

3,221,533
METHODS OF MANUFACTURING
THREADED CLOSURES
Adriaan Buys, Krommenie, Netherlands, assignor, by mesne assignments, to Inland Steel Company, Chicago, Ill., a corporation of Delaware
Original application Nov. 28, 1962, Ser. No. 240,529. Divided and this application Mar. 17, 1965, Ser. No. 447,938
Claims priority, application Great Britain, Nov. 29, 1961, 42,648/61
5 Claims. (Cl. 72—379)

The present application is a divisional application based on the copending application of Adriaan Buys, Serial No. 240,529, filed November 28, 1962.

The present invention relates generally to containers of the type having a sheet metal wall and, more particularly, to methods of manufacturing improved threaded closure seats for such containers. In its principal aspects, the invention is concerned with threaded closure seats for the bung-holes of such containers and with methods of manufacture of such seats.

Heretofore, sheet metal containers of the type used for packaging, storing and shipping of various commodities, for example, oil and oil products, and other liquid, semi-liquid, pulverized or granular substances, have commonly been provided with an aperture or bung-hole in one wall of the container, which bung-hole permits filling and emptying of the container. In order to allow closing and sealing of the container, a bung-hole bushing is generally mounted in the aperture and secured to the container wall. Such bushings are usually provided with internal screw threads adapted to receive an externally threaded bung or like closure member.

The manufacture of closure assemblies of the foregoing type has proved to be both laborious and costly, and has resulted in relatively heavy container constructions. Moreover, many manufacturing and constructional problems have been encountered, particularly where the container wall thickness is relatively thin. In an effort to solve these problems, attempts have been made to provide a construction in which the separate bung-hole bushing is dispensed with, for example, by forming the container wall with a closure seat which projects from and is integral with the container wall and which has screw threads pressed therein. However, it has been found that it is extremely difficult to press a sufficient number of threads in the seat, each having a sufficiently sharp profile to afford a liquid tight seal with a conventional closure such as a screw threaded plug or cap.

Consequently, it has been proposed that container walls be provided with integral polygonal collars projecting therefrom and having screw threads pressed in the flat sides thereof, thus forming a bung-hole closure flange having screw threads which are interrupted at equidistantly spaced points. Such a construction is disclosed in the copending application of Cornelis Andrianus Meyer, Serial No. 825,910, filed July 9, 1959, now Patent No. 3,076,670. While this type of construction has proved satisfactory in many instances, the present invention provides still another solution to the problems which have heretofore plagued container manufacturers.

It is a general aim of the present invention to provide improved methods for manufacturing threaded closure seats which overcome the foregoing disadvantages and which are characterized by their simplicity and adaptability to modern manufacturing procedures.

A related object of the invention is to provide a method of manufacturing threaded bung-hole closure flanges which permits of economical fabrication and which produces an improved threaded flange characterized by its sturdiness and reliability in use.

More specifically, an object of the invention is to provide improved methods for making an integral closure seat for containers which greatly facilitate the formation of screw threads in such seats and which permit such threads to be formed by relatively simple and conventional presses or like equipment.

In another of its important aspects, it is an object of the invention to provide an improved method of making closure seating arrangements, which permits the fabrication of a wide range of different size threaded closure seats suitable for receiving standard closure plugs or caps.

Yet another object of the invention is to provide an improved method of making threaded closure seats which permit the use of a wide variety of different grades and gauges of sheet metal for the container wall construction.

Other objects and advantages of the invention will become apparent as the following description proceeds, taken in conjunction with the accompanying drawings, in which.

Figure 1:
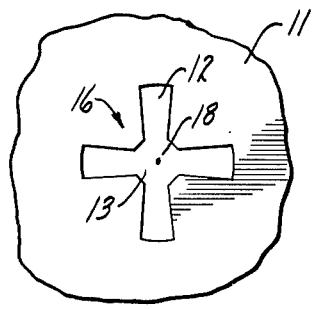
FIGURE 1 is a plan view of a portion of a container wall after completion of the first stage of the method for manufacturing a closure seat in accordance with the invention, the seat here being adapted to receive a ¾" plug.

While the invention is susceptible of various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents and alternatives falling within the spirit and scope of the invention as expressed in the appended claims.

Referring more particularly to the drawings, there is illustrated a novel seating arrangement for mounting plugs, caps and similar closures in the bung-holes of containers employing sheet metal walls. As the ensuing description proceeds, it will become apparent that the present invention is concerned with improved methods of manufacturing threaded closure seats of the type disclosed and claimed in the aforesaid application of Adriaan Buys, Serial No. 240,529, of which the present application is a divisional. For the purpose of simplifying the description and facilitating an understanding of the invention, an exemplary closure seating arrangement will hereinbelow be described in conjunction with methods embodying the invention for forming a screw threaded closure seat in a sheet metal wall 11 of a container (not shown).

In accordance with one of the important aspects of the present invention, provision is made for stamping, cutting or otherwise forming a generally star-like opening in a container wall, the opening defining a plurality of tongues which are then pressed so as to form portions of screw threads and bent out of the plane of the wall 11 to define segments of a closure seat having an interrupted helical screw thread formed therein. In the exemplary form of the invention (shown in FIGS. 1–3 after completion of sequential stages of the forming operation) the closure seat is formed in the wall 11 by creating a plurality of slots 12 extending substantially radially from a central point 18 or hole 13 in a star-like formation. The central hole 13 and the slots 12 may be formed in separate operations if desired, but they are preferably formed simultaneously. The operation or operations to form the central hole and the slots may, as well known to those skilled in the art, be carried out by means of a punching press (not shown) including a punch or male member having a cross-section corresponding to the shape of the hole with slots to be formed (for example, the hole 13 shown in FIGURE 1 which is provided with four such slots 12), and a die or female member having a hole of similar configuration, said members being reciprocable with respect to one another.

Figure 2:
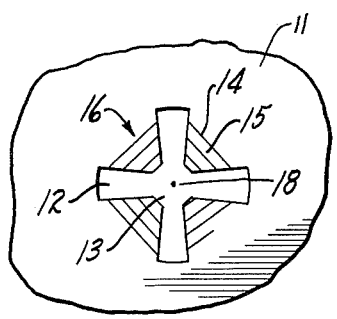
FIG. 2 is a view similar to FIG. 1 of the same container wall portion after the second stage of the closure seat forming operation.

In carrying out the present invention, provision is made for forming screw threads in the tongues 16 defined by the slots 12. To this end, and during the second stage of the operation, alternating grooves 14 and ridges 15 are pressed in the tongues 16 (FIGURE 2). As shown in the drawings, the distance between the grooves and the inner tips of the tongues (and thus also between the ridges and the inner tip of the tongues) gradually increases in a counterclockwise direction so that together they define a generally angular or jagged spiral built up of straight line sections.

Figure 3:
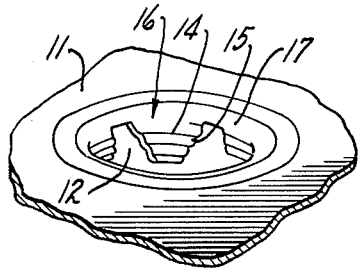
FIG. 3 is a perspective view of the container wall portion with a completed closure seat embodying the features of the invention formed therein.

During the last stage of the forming operation, the tongues 16 are bent out of the plane of the container wall 11 until they project at substantially right angles from the container wall, thus forming a closure seat integral with the container wall 11 (FIGURE 3). It will be observed that the grooves 14 and the ridges 15 in the tongues 16 together form a helix which defines either internal screw threads adapted to receive the external screw threads of a closure plug (not shown) or external screw threads adapted to cooperate with internal screw threads of a closure cap (not shown).

In keeping with the invention, the tongues 16 are preferably bent slightly less than 90° out of the plane of the container wall 11 when the container is to be closed by means of a threaded plug. In other words, they slightly converge in a direction away from the container wall and therefore resiliently hold a plug screwed into the closure seating means with a force progressively increasing towards the free extremities of the tongues.

Alternatively, if a screw cap is to be applied, the tongues 16 are preferably bent slightly over 90° out of the plane of the container wall 11 so that they slightly diverge in a direction away from the container wall.

While the exemplary closure construction has been illustrated and described in conjunction with grooves 14 and ridges 15 which constitute straight line portions of an angular spiral (thus the grooves and ridges form portions of a true common helix after the tongues have been bent at substantially right angles to the container wall), the grooves, and thus the ridges, may also form the sides of equilateral polygons of increasing sizes, so that the screw threads formed in the bent-over tongues are not truly helical but instead consist of "steps" arranged along a helical path. In this latter case the yielding and resilient nature of the tongues will allow adaption thereof to the truly helical screw threads of the closure member.

In carrying out the present invention, the marginal edge 17 of the container wall 11 surrounding the feet of the tongues 16 and the dead ends of the slots 12 is also bent out of the plane of the container wall, thereby forming an uninterrupted annular connection between said tongues and the container wall proper (FIG. 3). This annular connection may serve as a seat for a sealing gasket and to this end it is preferably formed with a slightly curved cross-section (FIG. 6).

Figure 4:
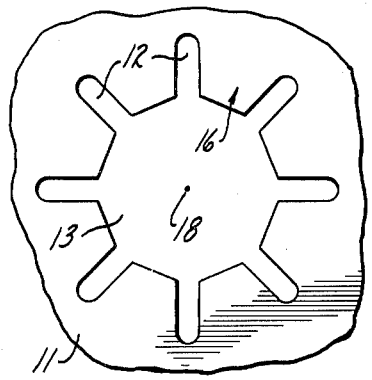
FIG. 4 is a view similar to that of FIG. 1 illustrating the initial forming stage for a slightly modified seat construction, also in accordance with the invention, such modified seat construction here being particularly suitable for reception of a larger closure member, e.g., a 2" plug.
Figure 5:
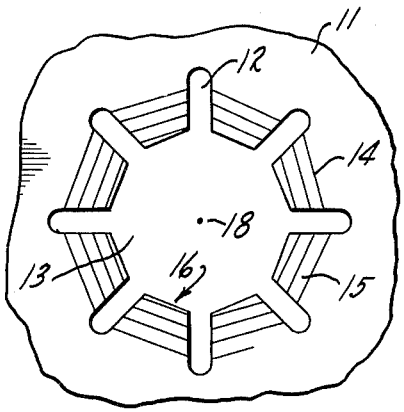
FIG. 5 is a view similar to FIG. 2 after the second stage of the forming operation performed on the modified seat, and, FIG. 6 is a perspective view, partly in section of the completed modified form of closure seat.
Figure 6:
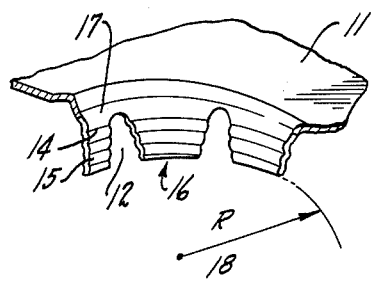

Referring to FIGS. 4–6 conjointly, there is illustrated a slightly modified closure seat which is generally similar to the seat described above. However, the modified form of closure seat is intended to receive a standard 2″ plug, whereas the construction shown in FIGS. 1–3 is designed to receive a standard ¾″ plug. Accordingly, the central hole 13 in the modified construction is formed with a relatively larger diameter (suitable for reception of a 2″ plug) in the order of 35 millimeters, whereas the slots have a relatively shorter length (in the order of 10–12 millimeters) as compared to the diameter of the hole. Moreover, eight slots 12 and consequently eight tongues 16 are formed in order to obtain a better approach to a purely cylindrical seat with less labor.

The tongues 16 bent out of the plane of the container wall 11 may be kept more or less in a flat condition, but as shown in the drawings they are preferably curved in a plane substantially parallel to the plane of the container wall, the concave side of the tongues being directed towards the center 18 of the closure seat. A particularly advantageous embodiment is that in which the tongues are bent into the shape of circular arcs having a radius R and all having their centers coinciding with the center 18 of the closure seat (FIG. 6).

It will be apparent from the foregoing that there have been provided novel methods of manufacturing threaded closures which permit of ease in manufacture, yet which provide an effective and positive means for securing threaded plugs or caps to the container wall. Moreover, the portions of the screw threads can be formed while the tongues are still disposed in the plane of the container wall, thus permitting the use of conventional up and down presses or the like, rather than the relatively complex equipment required to form screw threads in an annular sleeve or collar.

I claim as my invention:

1. A method of forming a closure seat for containers having a sheet metal wall, comprising, the steps of forming a plurality of slots in said wall extending radially from a common point with said slots defining a plurality of tongues, forming portions of screw threads in said tongues, and bending said tongues out of the plane of said wall.

2. A method of forming a closure seat for containers having a sheet metal wall, comprising, the steps of forming a plurality of slots in said wall extending radially from a common point with said slots defining a plurality of tongues, pressing portions of screw threads in said tongues, and bending said tongues and the marginal edge of said wall surrounding the outer extremities of said slots out of the plane of the wall.

3. A method of forming a closure seat for containers having a sheet metal wall, comprising, the steps of forming an aperture therein having a plurality of slots in said wall extending radially from the center thereof with said slots defining a plurality of tongues, forming portions of screw threads in said tongues, and bending said tongues out of the plane of said wall.

4. A method of forming a closure seat for containers having a sheet metal wall, comprising, the steps of forming a plurality of slots in said wall extending radially from a common point with said slots defining a plurality of tongues, forming portions of screw threads in said tongues, and bending the tongues out of the plane of the wall through an angle of slightly less than 90°.

5. A method of forming a closure seat for containers having a sheet metal wall, comprising, the steps of forming a plurality of slots in said wall extending radially from a common point with said slots defining a plurality of tongues, forming portions of screw threads in said tongues, and bending the tongues out of the plane of the wall through an angle of slightly greater than 90°.

References Cited by the Examiner

UNITED STATES PATENTS

| | | | |
|---|---|---|---|
| 2,207,564 | 7/1940 | Wackman. | |
| 2,271,762 | 2/1942 | Draper | 29—512 |
| 3,076,670 | 2/1963 | Meyer | 220—30 |
| 3,152,718 | 10/1964 | Weatherhead | 220—39 |

FOREIGN PATENTS

| | | |
|---|---|---|
| 847,537 | 7/1939 | France. |

CHARLES W. LANHAM, *Primary Examiner.*

WILLIAM H. JUST, *Assistant Examiner.*